(12) United States Patent
Sakagami et al.

(10) Patent No.: US 8,322,752 B2
(45) Date of Patent: Dec. 4, 2012

(54) LASER-MARKING MULTILAYER SHEET FOR ELECTRONIC PASSPORTS, AND ELECTRONIC PASSPORT

(75) Inventors: Toshinori Sakagami, Yokkaichi (JP); Akira Shimizu, Yokkaichi (JP); Akira Hashimoto, Yokkaichi (JP)

(73) Assignee: Japan Coloring Co., Ltd., Yokkaichi-Shi (JP)

( * ) Notice: Subject to any disclaimer, the term of this patent is extended or adjusted under 35 U.S.C. 154(b) by 235 days.

(21) Appl. No.: 12/992,081

(22) PCT Filed: May 13, 2009

(86) PCT No.: PCT/JP2009/058936
§ 371 (c)(1),
(2), (4) Date: Nov. 10, 2010

(87) PCT Pub. No.: WO2009/145060
PCT Pub. Date: Dec. 3, 2009

(65) Prior Publication Data
US 2011/0069134 A1     Mar. 24, 2011

(30) Foreign Application Priority Data
May 26, 2008   (JP) .................................. 2008-137027

(51) Int. Cl.
*B42D 15/00* (2006.01)
*B41J 2/435* (2006.01)
*B32B 3/00* (2006.01)

(52) U.S. Cl. .......... 283/86; 347/262; 347/264; 428/205; 428/207

(58) Field of Classification Search .................. None
See application file for complete search history.

(56) References Cited

U.S. PATENT DOCUMENTS

| 2006/0251869 A1 | 11/2006 | Herslow |
| 2009/0218396 A1* | 9/2009 | Lesur ............................ 235/380 |

FOREIGN PATENT DOCUMENTS

| EP | 0553508 A1 | 4/1993 |
| EP | 0676715 A2 | 10/1995 |
| EP | 1574359 A2 | 9/2005 |
| EP | 1852269 | 11/2007 |
| JP | 10-71763 | 3/1998 |

(Continued)

OTHER PUBLICATIONS

Extended European Search Report for corresponding EP Application No. 09754568.5-1217, Jun. 6, 2012.

(Continued)

*Primary Examiner* — Matthew Luu
*Assistant Examiner* — Kendrick Liu
(74) *Attorney, Agent, or Firm* — Ditthavong Mori & Steiner, P.C.

(57) ABSTRACT

There is provided a laser-marking multilayer sheet for an electronic passport formed by laminating five sheets of a multilayer sheet A/a multilayer sheet B/a film C/a multilayer sheet B/a multilayer sheet A. The multilayer sheet B is a colored laser-marking multilayer sheet. The film C is a laser-marking multilayer sheet made of a film for the electronic passport. The laser-marking multilayer sheet can have clear letters, symbols, and images, which are excellent in a laser-marking property and high in contrasts between the original surface color and the printed portions. The laser-marking multilayer sheet is excellent especially for inhibiting the falsification and forgery thereof.

20 Claims, 2 Drawing Sheets

FOREIGN PATENT DOCUMENTS

| | | |
|---|---|---|
| JP | 2002-273832 | 9/2002 |
| JP | 2003-285581 | 10/2003 |
| JP | 2007-210166 | 8/2007 |
| JP | 3889431 B1 | 8/2007 |
| JP | 2008110613 A * | 5/2008 |
| WO | WO 2006/087965 | 8/2006 |

OTHER PUBLICATIONS

International Search Report for International Application No. PCT/JP2009/058936, Aug. 4, 2009.

Written Opinion of the International Searching Authority for International Application No. PCT/JP2009/058936, Aug. 4, 2009.

* cited by examiner

LASER-MARKING MULTILAYER SHEET FOR ELECTRONIC PASSPORTS, AND ELECTRONIC PASSPORT

TECHNICAL FIELD

The present invention relates to a laser-marking multilayer sheet used for an electronic passport and to an electronic passport using the multilayer sheet for an electronic passport. Above all, the present invention relates to a laser-marking multilayer sheet used for an electronic passport capable of being subjected to marking on the multilayer sheet by laser beam irradiation without being damaged, capable of having clear letters, symbols, and images with high contrasts between the original surface color and the printed portions and excellent thermal resistance and productivity and to an electronic passport where the multilayer sheet for an electronic passport is used.

BACKGROUND ART

While the movement of human resources has been activated lately in the midst of ongoing international exchanges, the importance of a passport where personal information is recorded has been growing. In particular, a passport has been playing a role as a so-called identification (identification card or the like) issued by a country, which is an official body and has reliability.

In particular, since the September 11$^{th}$ terrorist attacks, in order to tighten up immigration and departure control of each country, ICAO (International Civil Aviation Organization), which is a specialized agency of the United Nations, established a standard, and the work for introducing electronic passports has been started. Since it is important to inhibit forgery in the work, a technique of laser-marking personal names, symbols, letters, photographs, and the like has been drawing attention.

By the way, since an electronic passport can identify an individual, if personal information can easily be falsified or faked, the reliability on the identification falls, and it may pose a problem for the development of international exchanges or worldwide movement of human resources.

Therefore, how to inhibit falsification and forgery in the aforementioned electronic passport is an important problem. Since the electronic passport has a light, thin, short, and small standard, how to clearly display personal names, symbols, letters, photographs, and the like with high contrasts is important. Further, since realization of clear display with high contrasts leads to previous inhibition of falsification and forgery, the market expectation is great.

For such problems, attention is paid to a technique of laser-marking personal names, symbols, letters, photographs, and the like, specifically, a multilayer sheet for laser marking. For example, there are the following Patent Documents 1 and 2.

Patent Document 1 discloses a laser-marking multilayer sheet which is a multilayer sheet having at least a surface layer and an internal layer and formed by subjecting (A) a surface layer of a transparent thermoplastic resin and (B) an internal layer of a thermoplastic resin composition containing 0.01 to 5 parts by weight of an energy absorber absorbing a (b-2) laser beam and 0.5 to 7 parts by weight of a (b-3) colorant with respect to 100 parts by weight of a (b-1) thermoplastic resin to melt coextrusion for the purpose of obtaining a multilayer sheet having no damage in appearance, good contrasts, and excellent surface flatness and smoothness and being capable of laser marking.

Patent Document 2 discloses a laser-marking multilayer sheet which is a multilayer sheet having at least the first surface layer/an internal layer/and the second surface layer and formed of (A) the first and the second transparent surface layers of a thermoplastic resin composition containing 0.001 to 5 parts by weight of mica and/or carbon black with respect to 100 parts by weight of a transparent thermoplastic resin and (B) an internal layer of a thermoplastic resin composition containing 0.001 to 3 parts by weight of an energy absorber absorbing a laser beam with respect to 100 parts by weight of a thermoplastic resin with a composition ratio of the first surface layer/internal layer/the second layer of 1:4:1 to 1:10:1 and formed by subjecting the first surface layer/the internal layer/the second surface layer to melt coextrusion for the purpose of obtaining a multilayer sheet having no damage in appearance, good contrasts, and excellent surface flatness and smoothness and being capable of laser marking.

For certain, since each of the laser-marking multilayer sheets in Patent Documents 1 and 2 has excellent thermal adhesiveness with these multilayer sheets or, for example, with a thermoplastic resin sheet such as a PETG sheet or an ABS resin sheet and can obtain sufficient printability for printing letters and numbers by laser marking by laser beam irradiation, it deserves recognition. However, there is a problem of insufficient drawing of an image of a person's face or the like as a passport as a so-called identification. That is, a sufficient response to how to display personal information such as a personal name, symbols, letters, a photograph, and the like clearly in a light, thin, short, and small standard is not shown.

PRIOR ART DOCUMENT

Patent Document
  Patent Document 1: JP-A-2002-273832
  Patent Document 2: Japanese Patent No. 3889431

SUMMARY OF THE INVENTION

The present invention has been made in order to solve the aforementioned problems and aims to provide a laser-marking multilayer sheet for an electronic passport, the sheet being able to have clear letters, symbols, and images, which are excellent in a laser-marking property and high in contrasts between the original surface color and the printed portions; being excellent in thermal adhesiveness in a lamination step of multilayer sheets, and having a lamination structure using a laminating film having strength, flexibility, and transparency in the central portion of the lamination sheet in order to be attached to the front cover or the back cover of an electronic passport by an easy manufacturing step such as machine sawing upon manufacturing an electronic passport using a laser-marking multilayer sheet having a sheet conveyance property, releasability from a die after thermal press, thermal resistance, and foldability and to provide an electronic passport using the laser-marking multilayer sheet for an electronic passport. In particular, they are excellent in inhibiting the falsification and forgery thereof.

According to the present invention, there is provided the following laser-marking multilayer sheet for an electronic passport.

[1] A laser-marking multilayer sheet for an electronic passport, which is formed by laminating five layers of a multilayer sheet A/a multilayer sheet B/a film C/a multilayer sheet B/a multilayer sheet A; wherein the multilayer sheet A is a transparent laser-marking multilayer sheet having skin layers and a core layer and formed of at least three layers of sheets laminated by a coextrusion method, the skin layers functioning as the outermost layers of the multilayer sheet A are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90 to 30/10 to 70 mol %, the core layer of the multilayer sheet A is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates having an average particle diameter of below 150 nm, the entire thickness of the multilayer sheet A is 50 to 150 μm and the thickness of the core layer accounts for 35% or more and below 85% of the entire thickness of the multilayer sheet A, the multilayer sheet B is a colored laser-marking multilayer sheet having skin layers and a core layer and formed of at least three layers of sheets laminated by a coextrusion method, the skin layers functioning as the outermost layers of the multilayer sheet B are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90 to 30/10 to 70 mol %, the core layer of the multilayer sheet B is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates, and 1 part by mass of a coloring inorganic pigment, the entire thickness of the multilayer sheet B is 50 to 250 μm, and the thickness of the core layer accounts for 35% or more and below 85% of the entire thickness of the multilayer sheet B, and the film C is a laser-marking multilayer sheet made of one film selected from a polyester resin film, a thermoplastic urethane resin film, and a nylon resin film or one kind of cloth selected from polyester cloth and nylon cloth, and the thickness of the film C is 20 to 200 μm.

[2] The laser-marking multilayer sheet for an electronic passport according to [1], wherein one end of the film C has a protruding portion protruding by 5 to 100 mm from the multilayer sheet A and the multilayer sheet B.

[3] The laser-marking multilayer sheet for an electronic passport according to [1] or [2], which is formed by, after laminating the multilayer sheet B/the film C/the multilayer sheet B and then performing printing on a surface of the sheet B, the multilayer sheets A are laminated to obtain a five layers of the multilayer sheet A/the multilayer sheet B/the film C/the multilayer sheet B/the multilayer sheet A.

[4] The laser-marking multilayer sheet for an electronic passport according to any one of [1] to [3], wherein at least one surface of each of the multilayer sheets A and the multilayer sheets B is subjected to matting.

[5] The laser-marking multilayer sheet for an electronic passport according to any one of [1] to [3], wherein a surface of each of the multilayer sheets A and the multilayer sheets B is subjected to matting to have an average roughness (Ra) of 0.1 to 5 μm.

[6] The laser-marking multilayer sheet for an electronic passport according to any one of [1] to [5], wherein the core layer and/or the skin layer of the multilayer sheet A and/or the multilayer sheet B contain(s) 0.1 to 5 parts by mass of an antioxidant and/or an anticolorant and 0.1 to 5 parts by mass of an ultraviolet absorber and/or a light stabilizer with respect to 100 parts by mass of thermoplastic resin.

[7] The laser-marking multilayer sheet for an electronic passport according to any one of [1] to [6], wherein a hot-melt adhesive is applied on one surface of each of the multilayer sheet A and the multilayer sheet B.

[8] An electronic passport, where a laser-marking multilayer sheet for an electronic passport according to any one of [1] to [7] is used and where the five-layer lamination sheet of the multilayer sheet A/the multilayer sheet B/the film C/the multilayer sheet B/the multilayer sheet A is attached to the front cover or the back cover of an electronic passport by machine sawing and/or bonding by the use of the protruding portion of the film C.

[9] A method for laser-marking on a laser-marking multilayer sheet according to any one of [1] to [7] or an electronic passport according to [8], wherein printing is performed by irradiation with a laser beam from the side of the multilayer sheet A laminated in the laser-marking multilayer sheet.

According to the present invention, there are exhibited excellent effects of being able to provide a laser-marking multilayer sheet for an electronic passport being able to have clear letters, symbols, and images, which are excellent in a laser-marking property and high in contrasts between the original surface color and the printed portions; being excellent in thermal adhesiveness in a lamination step of multilayer sheets, having a sheet conveyance property, releasability from a die after thermal press, thermal resistance, and foldability, and having excellent productivity and provide an electronic passport. In particular, the present invention is excellent in inhibiting the falsification and forgery thereof.

BEST MODE FOR CARRYING OUT THE INVENTION

Hereinbelow, the best mode for carrying out a laser-marking multilayer sheet for an electronic passport of the present invention will be described specifically. However, the present invention widely includes a laser-marking multilayer sheet for an electronic passport provided with the invention-specifying matter and is not limited to the following embodiments.

Figure 1:
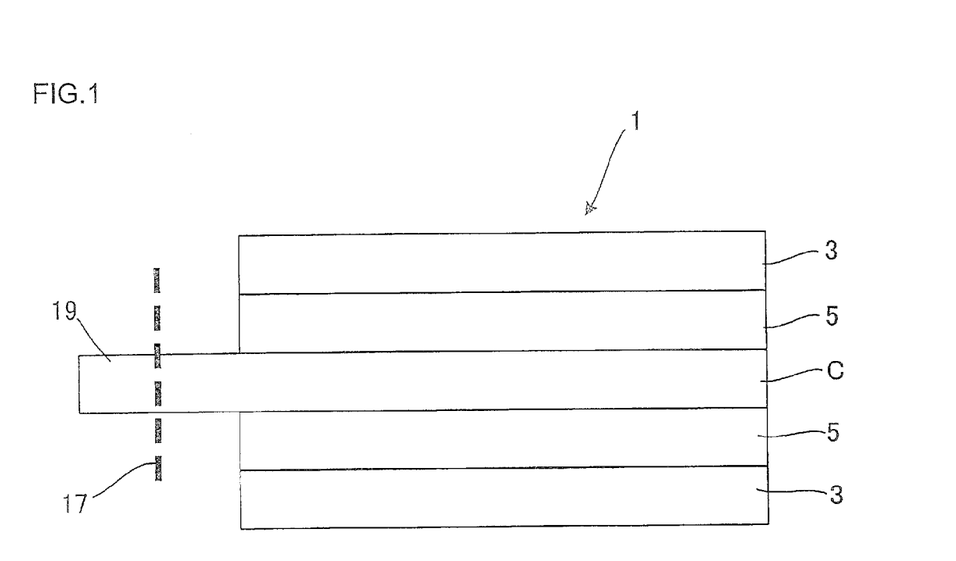
FIG. 1 is a schematic view showing an embodiment of a laser-marking multilayer sheet for an electronic passport of the present invention and cross-sectional view.
Figure 3:
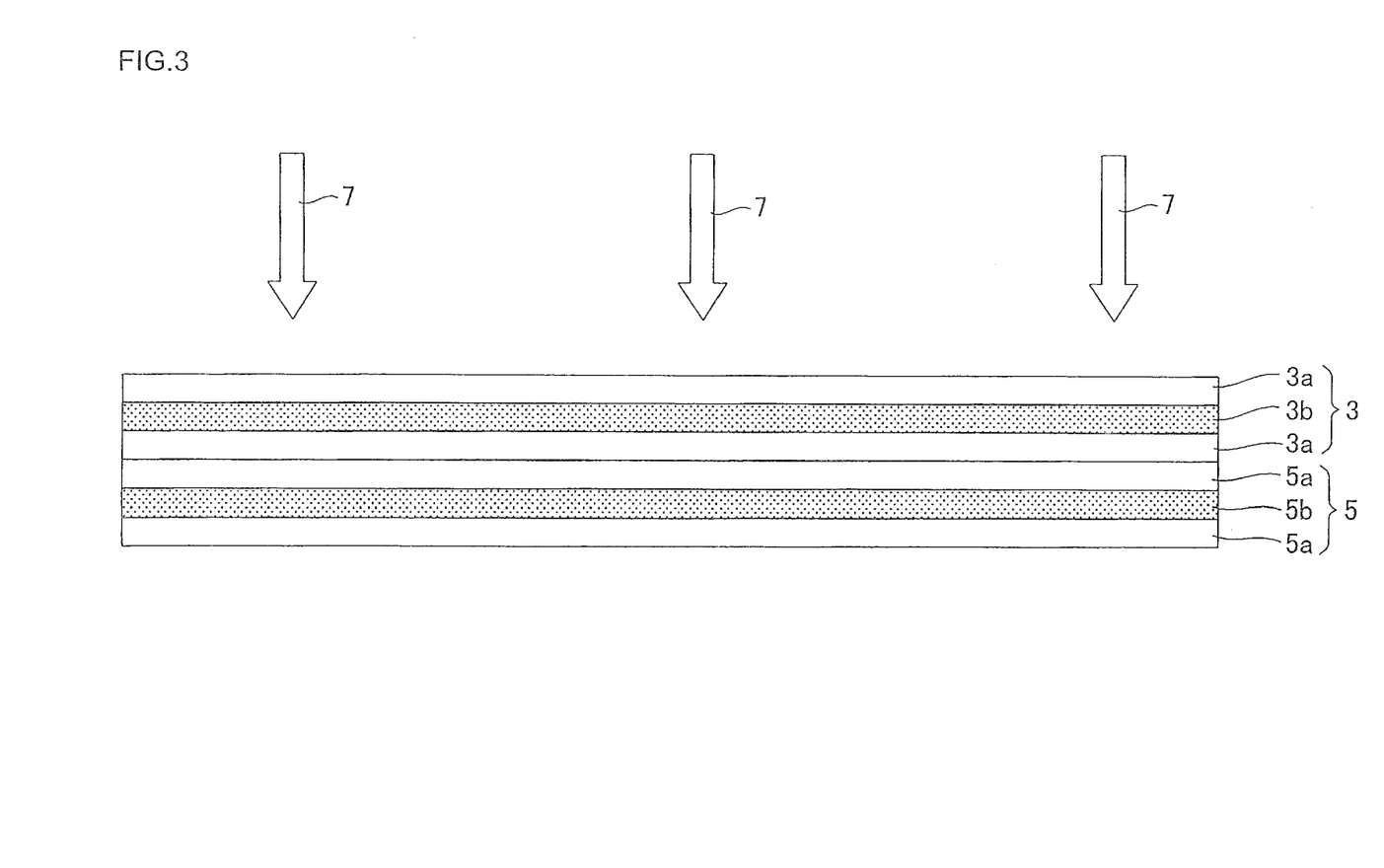
FIG. 3 is a partially enlarged view of a laser-marking multilayer sheet for an electronic passport of the present invention and view schematically showing a multilayer sheet A and a multilayer sheet B.

[1] Constitution of laser-marking multilayer sheet for electronic passport of the present invention:

As shown in FIGS. 1 and 3, a laser-marking multilayer sheet for an electronic passport of the present invention is a laser-marking multilayer sheet for an electronic passport obtained by laminating five layers of a multilayer sheet A/a multilayer sheet B/a film C/a multilayer sheet B/a multilayer sheet A. The multilayer sheet A (reference numeral 3) is a transparent laser-marking multilayer sheet having skin layers 3a and a core layer 3b and formed of at least three-layer sheets laminated by coextrusion. The skin layers 3a functioning as the outermost layers of the multilayer sheet A are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90 to 30/10 to 70 mol %, and the core layer 3b of the multilayer sheet A is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates having an average particle diameter of below 150 nm. Further, the entire thickness of the multilayer sheet A is 50 to 150 µm, and the thickness of the core layer accounts for 35% or more and below 85% of the entire thickness of the multilayer sheet A. The multilayer sheet B (reference numeral 5) is a colored laser-marking multilayer sheet having skin layers 5a and a core layer 5b and formed by at least three layers of sheets laminated by a coextrusion method. The skin layers 5a functioning as the outermost layers of the multilayer sheet B are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90 to 30/10 to 70 mol %, and the core layer 5b of the multilayer sheet B is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates, and 1 part by mass of a coloring inorganic pigment. Further, the entire thickness of the multilayer sheet B is 50 to 250 and the thickness of the core layer accounts for 35% or more and below 85% of the entire thickness of the multilayer sheet B. The film C (symbol C) is a laser-marking multilayer sheet 1 for an electronic passport, the sheet being made of one film selected from a polyester resin film, a thermoplastic urethane resin film, and a nylon resin film or one kind of cloth selected from polyester cloth and nylon cloth, and the thickness of the film C is 20 to 200

[A] Multilayer Sheet A:

The multilayer sheet A is constituted as a transparent laser-marking multi layer sheet having skin layers and a core layer and formed of at least three layers of sheets laminated by a coextrusion method.

[A-1] Three-Layer Sheet:

As shown in FIG. 3, the multilayer sheet A is constituted as a sheet having a structure of at least three layers of skin layers 3a and a core layer 3b and formed to be laminated by a coextrusion method. Incidentally, the three-layer sheet of the present embodiment has "at least three layers" and is not limited to a sheet having a three-layer structure. That is, in a transparent laser-marking multilayer sheet A of the present embodiment, the "three-layer sheet" is for convenience of description, and the "three-layer sheet" means a "sheet having at least three layers" and does not intend to be limited to a sheet of "three layers". In other wards, as long as it is constituted of at least three layers, any sheet constituted of five layers, seven layers; or larger odd-numbered layers is included in the multilayered sheet A of the present embodiment.

However, also in the case that the multilayer sheet A of the present embodiment has the aforementioned multilayer structure, it is necessary that the skin layers described later are disposed on outermost sides of the sheet having the multilayer structure on both the sides of the sheet in such a manner that the core layer is sandwiched between the skin layers. Incidentally, though there is no particular limitation on the thickness of the skin layer, it is more preferable that the skin layer is formed to have a thickness in the predetermined range described later.

On the other hand, even in the case that the multilayer sheet A is constituted of the aforementioned "larger odd-numbered layers", in the case of a structure having a too large number of layers, when thickness of each of the skin layers and core layers is too small, so-called die sticking is caused in the hot press step upon lamination. Therefore, the multilayer sheet A is constituted of preferably five layers, more preferably three layers.

Here, the reason why the sheet is constituted of odd-numbered layers as described above is because a transparent laser-marking multilayer sheet A of even-numbered layers has the same constitution as that of a transparent laser-marking multilayer sheet A of odd-numbered layers by necessity. For example, a transparent laser-marking multilayer sheet A having four layers has a disposition of a skin layer (PETG)/a core layer (PC)/a core layer (PC)/a skin layer (PETG), which is, after all, the same constitution as that of a transparent laser-marking multilayer sheet A of odd-numbered layers.

In addition, for example, a multilayer sheet constituted of three layers is formed in such a manner that two skin layers are disposed on both the outermost sides (one side and the other side) with a core layer being disposed between the two skin layers to have a disposition of a skin layer (PETG)/a core layer (PC)/a skin layer (PETG). In addition, for example, a multilayer sheet having five layers may be formed in such a manner that two skin layers are disposed on both the outermost sides (one side and the other side) with skin layers and core layers being alternately disposed to have a disposition of a skin layer (PETG)/a core layer (PC)/a skin layer (PETG)/a core layer (PC)/a skin layer (PETG). By thus forming a multilayer sheet having a multilayer structure, a sufficient thermal adhesiveness can be secured, and fine adjustment is possible in a sheet conveyance property in the lamination step, releasability from a die after thermal press, foldability, transparency, and the like.

In addition, it is desirable that the entire thickness (total thickness) of the three-layer sheet is 50 to 150 μm and that the ratio of the thickness of the core layer with respect to the entire thickness of 35% or more and below 85%. When the entire thickness of the three-layer sheet is below 50 μm, there may easily arises a problem of so-called die sticking where the multi-layer sheet sticks on the die upon thermal fusion bonding in the multilayer sheet lamination step, and controlling the fusion bonding temperature, press pressure upon fusion bonding, fusion bonding time, and the like is complex in order to get rid of such a trouble, which is liable to make trouble in the forming step. In addition, when the total thickness of the three-layer sheet is above 150 μm, in the case of forming a multilayer sheet for an electric passport by the use of the three-layer sheet having a thickness of above 150 μm, the entire thickness is too large, and it is hard to use. Further, in the multilayer sheet A, it is desirable that the ratio of the core layer to the entire thickness is 35% or more and below 85%. When the skin layer is too thin, there are caused generation of die sticking and deterioration of thermal adhesiveness. On the other hand, when the skin layer is too thick, the thickness of the core layer described later inevitably becomes small to cause a problem of deterioration in the laser-marking property or generation of warpage after the lamination of a multilayer sheet, which is not preferable.

By setting the thickness of the entire three-layer sheet to be a desired thickness, not only local properties such as properties of the multilayer sheet A can easily be drawn out, but also the properties of the entire present embodiment such as a laser-marking multilayer sheet of the present embodiment (multilayer sheet having the multilayer sheet A and the multilayer sheet B) can easily be drawn out. Further, by setting not only the total thickness of the entire three-layer sheet, but also the ratios of the skin layer and the core layer constituting the three-layer sheet to the thickness of the three-layer sheet in the aforementioned desired ratios, an effect of the present application is more exhibited in such a manner that the laser-marking property can be enhanced with setting the thickness of the entire three-layer sheet within a desired range, which is preferable.

Incidentally, since the problems of adhesiveness of the multilayer sheet and die sticking serve as very important elements of practical use and productivity of the multilayer sheet and regarding whether it can respond to a market need, the relation between the total thickness of the entire three-layer sheet and thickness of each of the skin layer and the core layer will be described in detail.

[A-1-1] Skin Layer in Multilayer Sheet A:

The skin layers in the multilayer sheet A are constituted as both the outermost layers disposed on the outsides of the three-layer sheet. That is, the skin layers are disposed so as to sandwich the core layer in the multilayer sheet A described later from both the end face sides (outsides) of the core layer to play a role of surface layers (outermost layers) of the three-layer sheet.

Thickness of the skin layers is preferably the same. When the multilayer sheet A is constituted of skin layers having different thickness, as described above, warpage of the sheet is generated in a multilayer sheet press step or the like, which is not preferable. In addition, for example, in the case that the multilayer sheet A is constituted of three layers of a skin layer (PETG)/a core layer (PC)/a skin layer (PETG) and that the thickness of the core layer is 35% or more and below 85%, the skin layer is 15% or more and below 65% in total on both sides. When the skin layer is too thin, generation of die sticking and deterioration of thermal adhesiveness are caused. On the other hand, when the skin layer is too thick, the core layer described later becomes thin inevitably to cause a problem of deterioration in the laser-marking property or generation of warpage after the lamination of the multilayer sheet, which is not preferable. Therefore, it is desirable to form the skin layer to have a desirable thickness.

As a material for forming a skin layer, there is formed a layer made of a noncrystalline aromatic polyester based resin composition described later and obtained by preparing a polyester based resin composition, that is, a copolymer polyester resin (see [A-1-1-1]) described later and a lubricant (see [A-1-1-2]) described later.

[A-1-1-1] Copolymer Polyester Resin:

A copolymer polyester resin used for the present embodiment is blended as the main component of the noncrystalline aromatic polyester based resin composition. As the copolymer polyester resin, for the skin layer, there is used a copolymer polyester resin which is a polyester composed of a dicarboxylic acid unit having mainly a telephthalate unit, an ethylene glycol unit (I), and a glycol unit having mainly 1,4-cyclohexane dimethanol unit (II), and where a ratio of the ethylene glycol unit (I) to the 1,4-cyclohexane dimethanol unit (II) ((I)/(II)) is 90 to 30/10 to 70 mol %. The reason why the component amounts of the ethylene glycol and 1,4-cyclohexane dimethanol contained in the copolymer polyester resin are prepared is because the resin obtained with a substitution amount of the ethylene glycol component being below 10% in the copolymer polyester resin is not sufficiently noncrystalline to allow recrystallization to proceed in the cooling step after thermal fusion bonding, which deteriorates thermal adhesiveness. In addition, the resin obtained with above 70% is not sufficiently noncrystalline to allow recrystallization to proceed in the cooling step after thermal fusion bonding, which deteriorates thermal adhesiveness. Therefore, the resin obtained by preparing the component amounts of the ethylene glycol and 1,4-cycrohexane dimethanol as in the present embodiment is a preferable resin because it is sufficiently crystalline and excellent in thermal adhesiveness.

Further, as this copolymer polyester resin, for example, a noncrystalline aromatic polyester based resin (trade name of "PETG" produced by Eastman Chemical Company) where about 30 mol % of ethylene glycol component in polyethylene telephthalate is substituted by 1,4-cycrohexane dimethanol is commercially available.

[A-1-1-2] Lubricant:

The lubricant used in the present embodiment is prepared in such a manner that at least one kind of lubricant selected from fatty acid esters, fatty acid amides, and fatty acid metal salts with respect to 100 parts by mass of a copolymer polyester resin which is a polyester [A-1] composed of a dicarboxylic acid unit having mainly a telephthalate unit, an ethylene glycol unit (I), and a glycol unit having mainly 1,4-cyclohexane dimethanol unit (II) and which has a ratio of the ethylene glycol unit (I) to the 1,4-cyclohexane dimethanol unit (II) ((I)/(II)) of 90 to 30/10 to 70 mol %. The addition amount of the lubricant is 0.01 to 3 parts by mass, preferably 0.05 to 1.5 parts by mass. When it is below 0.01 parts by mass, fusion bonding on the pressing plate is caused upon hot press, while, when it is above 3 parts by mass, a problem is caused in the thermal adhesiveness of the card, which are not preferable.

Examples of the fatty acid ester based lubricant includes butyl stearate, cetyl permirate, monoglyceride stearate, diglyceride stearate, triglyceride stearate, montan wax acid ester, wax ester, dicarboxylate ester, and complex ester. Examples of the fatty acid amide based lubricant, stearic acid amide, and ethylenebis stearyl amide. In addition, examples of the fatty acid metal salt based lubricant include calcium stearate, magnesium stearate, zinc stearate, aluminum stearate, and barium stearate.

[A-1-2] Core Layer in Multilayer Sheet A:

A core layer is constituted as a so-called nucleus layer disposed in the center of the three sheets. That is, the core layer is formed as the nucleus layer of the three layer sheets in such a manner that it is sandwiched between two skin layers disposed on the outermost sides. As the thickness of the core layer, the ratio of the thickness of the core layer to the thickness of the entire sheets is preferably 35% or more and below 85%. It is preferably 40% or more and below 80%. When the ratio of the thickness of the core layer is 85% or more, since the total thickness of the transparent-laser marking multilayer sheet A is so thin as 50 to 150 µm, the skin layer becomes relatively thin, and, even if a lubricant is mixed in a skin layer, there arises a problem of die sticking where the transparent laser-marking multilayer sheet A sticks to the die in a hot press step in the lamination step, which is not preferable. In addition, when the ratio of the thickness of the core layer is below 35%, though there does not arise die sticking since a skin layer is thick in the lamination step, a laser-marking property deteriorates, and the thermal resistance becomes poor to cause warpage of the sheet, which are not preferable.

As the material constituting the core layer, a transparent polycarbonate resin is used. There is no particular limitation on the polycarbonate resin to be used, the polycarbonate resin having a melt volume rate of 4 to 20 can suitably be used. When the melt volume rate is below 4, though it is meaningful in that the toughness of the sheet is improved, since forming workability deteriorates, it has difficulty in practical use. In addition, when the melt volume rate is above 20, the sheet has poor toughness, which is not preferable.

[A-1-3] Energy Absorber:

An example of the energy absorber is at least one kind selected from the group consisting of carbon black, metal oxides, metal sulfides, carbonates, and metal silicates.

The carbon black is preferably a carbon black having an average particle diameter of 10 to 90 nm and a dibutylphthalate (DBT) oil absorption amount of 60 to 170 ml/100 g. When the average particle diameter of the carbon black is below 10 nm, laser chromic property falls, and handling is difficult because it is too fine, while, when it is above 90 nm, transparency of the sheet falls, or serious unevenness is generated on the surface of the sheet, which is not preferable. In addition, when the DBT oil absorption is below 60 ml/100 g, dispersibility is poor, while, when it is above 170 ml/100 g, it has a poor opacifying property, which is not preferable.

In addition, for the metal oxide, examples of the metal forming an oxide include zinc, magnesium, aluminum, iron, titanium, silicon, antimony, tin, copper, manganese, cobalt, vanadium, niobium, molybdenum, ruthenium, tungsten, palladium, silver, and platinum. Further, examples of the composite metal oxide include ITO, ATO, and AZO.

In addition, examples of the metal sulfide include zinc sulfide and cadmium sulfide. Further, examples of the carbonate include calcium carbonate, and examples of the metal silicate include aluminum silicate, aluminum silicate containing iron (mica), hydrated aluminum silicate (kaolin), magnesium silicate (talc), calcium silicate, and magnesium silicate. These metal oxides, composite metal oxides, and metal sulfides have an average particle diameter of below 150 nm, preferably below 100 nm.

In addition, as the energy absorber, carbon black, metal oxides, and composite metal oxides are suitably used independently or in combination.

As the addition amount (blend amount) of the energy absorber, 0.0001 to 3 parts by mass, more preferably 0.0001 to 1 parts by mass, of the carbon black is added (blended). In addition, when both the carbon black and at least one kind selected from the group consisting of metal oxides, metal sulfides, metal carbonates, and metal silicates and having an average particle diameter of below 150 nm are used together, the blend amount of the mixture is 0.0001 to 6 parts by mass, more preferably 0.0001 to 3 parts by mass. The reason why the addition amount (blend amount) of the energy absorber is thus prepared is as follows. That is, the transparent laser-marking multilayer sheet A is preferably transparent, and there are many cases that printing is performed on the colored laser-marking sheet B which is the lower layer of the transparent laser-marking multilayer sheet A. In that case, when the transparency of the transparent laser-marking multilayer sheet A is poor, the image, letters, or the like printed is/are not clear, which causes a problem for practical use. Therefore, the carbon black having a small average particle diameter is preferably used. In addition, even when a mixture of carbon black with at least one selected from other metal oxides, metal sulfides, metal carbonates, and metal silicates is used as the laser energy absorber, the average particle diameter of the metal oxides, metal sulfides, metal carbonates, and metal silicates is at least below 150 nm, preferably below 100 nm, more preferably below 50 nm.

Therefore, when the average particle diameter of these laser energy absorbers is above 150 nm, the transparency of the transparent laser-marking multilayer sheet A falls, which is not preferable. In addition, when the blend amount of these laser energy absorbers is above 6 parts by mass, transparency of the transparent laser-marking multilayer sheet A falls, and the resin is deteriorated because of too much energy amount. Therefore, a sufficient contrast cannot be obtained. On the other hand, when the addition amount of the laser energy absorber is below 0.0001 parts by mass, a sufficient contrast cannot be obtained, which is not preferable.

[A-1-4] Antioxidant and/or Anticolorant:

An antioxidant and/or an anticolorant are/is preferably contained at a rate of 0.1 to 5 parts by mass with respect to 100 parts by mass of the polycarbonate resin in the case of the core layer or the copolymer polyester resin in the case of the skin layer in the core layer and/or the skin layer. Addition (blending) of the antioxidant and/or the anticolorant effectively influences on the property deterioration and the hue stabilization due to decrease in the molecular weight upon forming process. As the antioxidant and/or anticolorant, a phenol based antioxidant and/or a phosphite ester based anticolorant are/is used.

Examples of the phenol based antioxidant include α-tocopherol, butylhydroxytoluene, sinapyl alcohol, vitamin E, n-octadecyl-3-(3,5-di-t-butyl-4-hydroxyphenol)propionate, 3-5-di-t-butyl-4-hydroxytoluene, pentaerythrityl-tetrakis[3-(3,5-di-t-butyl-4-hydroxyphenyl)propyonate], triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2-tert-butyl-6-(3'-tert-butyl-5'-methyl-2'-hydroxybenzil)-4-methylphenylacrylate, 2,6,-di-tert-butyl-4-(N,N-dimethylaminomethyl)phenol, 3-5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tertbutylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl6-(3-tert-butyl-5-methyl-2-hydroxybenzyl)phenyl]telephthalate, 3,9-bis{2-[3-(3-tert-butyl-4-hydroxy-5-methylphenyl)propionyloxy]-1,1,-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-tiodiethylenebis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propyonyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 1-3-5-tris2[3(3,5-di-tert-butyl-4-hydroxyphenyl)propyonyloxy]ethylisocyanurate, and tetrakis[3-(3,5-di-tert-butyl-4-hydroxyphenyl)propyonyl oxymethyl]methane.

Of these, particularly preferable are n-octadecyl-3-(3,5-di-tert-buryl-hydroxyphenyl)propyonate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, and tetrakis[3-(3,5-di-tert-butyl-4-hydroxyphenyl)propyonyl oxymethyl]methane, and particularly preferable is n-octadecyl-3-(3,5-di-tert-butyl-4-hydroxyphenyl)propionate. The above hindered phenol based antioxidants may be used alone or in combination of two or more kinds.

Examples of the phosphite ester based anticolorant include triphenyl phosphite, tris(nonylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phospite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tri(di-n-butylphenyl)phosphite, tris (2,4,-di-tert-butylphenyl)phosphite, tris(2,6-di-tert-butylphenyl) phosphite, distearylpentaerythritol diphospite, bis(2,4-di-tert-butylphenyl)pentaerithritol diphosphite, bis(2,6-di-tert-butyl-4-methylphenyl)pentaerithritol diphosphite, bis(2,6-di-tert-butyl-4-ethylphenyl)pentaerithritol diphosphite, phenylbisphenol A pentaerithritol diphosphite, bis(nonylphenyl)pentaerithritol diphosphite, and dicyclohexylpentaerithritol diphosphite.

Further, other phosphite compounds which react with divalent phenols and which has a cyclic structure. Examples of the phosphite compounds include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite, and 2,2'-ethylidenebis(4-methyl-6-tert-butylphenyl)(2-tert-butyl-4-methylphenyl)phosphite.

Of these, particularly preferable is tri(2,4-di-tert-butylphenyl)phosphite. The phosphite ester based anticolorants may be used alone or in combination of two or more kinds. Alternatively, it may be used together with a phenol based antioxidant.

In addition, it is preferable that 0.1 to 5 parts by mass of an ultraviolet absorber and/or a light stabilizer is contained with respect to 100 parts by mass of polycarbonate resin in the case of a core layer or copolymer polyester resin in the case of a skin layer in the core layer and/or the skin layer. Further, the addition (blend) of the ultraviolet absorber and/or a light stabilizer effectively acts on the inhibition of the light resistance to deterioration upon storing the transparent laser-marking multilayer sheet A and upon practical use of the electronic passport which is a final product.

Examples of the ultraviolet absorber include 2-(2'-hydroxy-5'-methylphenyl)benzotriazole, 2-(2'-hydroxy-3',5'-di-tert-amylphenyl)benzotriazole, 2-(2'-hydroxy-3',5'-bis(α,α'-dimethylbenzyl)phenylbenzotriazole, 2,2' methylenebis [4-(1,1,3,3-tetramethylbutyl)-6-(2H-benzotriazole-2-yl) phenol], and a benzotriazole based compound represented by a condensate with methyl-3-[3-tert-butyl-5-(2H-benzotriazole-2-yl)-4-hydroxyphenylpropionate-polyethylene glycol.

Further, examples of the ultraviolet absorber include a hydroxyphenyltriazine based compound such as 2-(4,6-diphenyl-1,3,5-triazine-2-yl)-5-hexyloxyphenol, 2-(4,6-bis (2,4-dimethylphenyl)-1,3,5-triazine-2-yl)-5-hexyloxyphenol.

Further, examples of the ultraviolet absorber include a cyclic imino ester based compound such as 2,2'-p-phenylenebis(3,1-benzoxazine-4-one), 2-2'-m-phenylenebis(3,1-benzoxazine-4-one), and 2,2'-p,p'-diphenylenebis(3,1-benzoxazine-4-one).

In addition, examples of the light stabilizer include bis(2,2,6,6-tetramethyl-4-piperidyl)sebacate, bis(1,2,2,6,6-pentamethyl-4-piperidyl)sebacate, tetrakis (2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly{[6-(1,1,3,3-tetramethylbutyl)amino-1,3,5-triazine-2,4-diyl][(2,2,6,6-tetramethylpiperidyl)imino]hexamethylene [(2,2,6,6-tetramethylpiperidyl)imino]}, and a hyndered amine based light stabilizer represented by polymethylpropyl-3-oxy-[4-(2,2,6,6-tetramethyl)piperidinyl]siloxane or the like. Such a light stabilizer exhibits better performance in weather resistance in the use in combination with the aforementioned ultraviolet absorber or, in some cases, various antioxidants.

[A-1-5] Matting:

In addition, it is preferable that one surface of the multilayer sheet A is subjected to matting. Further, it is preferable that both surfaces of the multilayer sheet A are subjected to matting to have an average roughness (Ra) of 0.1 to 5 μm. The reason why the surface (s) of the multilayer sheet A is (are) subjected to matting is because, for example, in the case of the hot press forming with the constitution of the multilayer sheet A/the multilayer sheet B of the laser-marking multilayer sheet of the present embodiment, the air between the multilayer sheet A and the multilayer sheet B easily comes out, and, in the case of conveying the multilayer sheets into the lamination step, when the multilayer sheet is removed by injecting air after the multilayer sheets are laminated with positioning them after the sheets are sucked in and/or suctioned up, if the matting is not performed, there is a tendency of causing a problem of difficulty in removal or slippage of lamination position even if removal can be performed. In addition, when the average roughness (Ra) of matting is above 5 μm, thermal adhesiveness of the transparent laser-marking multilayer sheet A/the colored laser-marking multilayered sheet B tends to decrease.

Further, when the average roughness (Ra) of the surface is below 0.1 μm, as described above, there is a tendency of causing a problem of sticking of the sheet to the conveying apparatus upon conveyance or lamination of the sheet.

[B] Constitution of Multilayer Sheet B:

The colored laser-marking multilayer sheet B of the present invention has skin layers 5a and a core layer 5b as shown in FIG. 3 and constituted as a laser-marking multilayer sheet formed of at least three-layer sheets laminated by a coextrusion method.

Incidentally, for convenience of description, regarding the constituents which are the same as those of the aforementioned multilayer sheet A, description is omitted as much as possible with just describing that effect, and constituents different from those of the multilayer sheet A will be described in detail from the next paragraph. Therefore, regarding the constituents which are the same as those of the multilayer sheet A, please refer to the description of the multilayer sheet A. However, when the multilayer sheet A is referred to, needless to say, the "multilayer sheet A" is suitably replaced by the "multilayer sheet B".

[B-1] Three-Layer Sheet:

The multilayer sheet B is constituted as a sheet having at least three-layer structure having skin layers and a core layer and lamination-formed by a coextrusion method. Incidentally, since the definition of the three-layer sheet is the same as that of the multilayer sheet A, please refer to the description of the three-layer sheet [A-1] of the multilayer sheet A.

In addition, it is preferable that the entire thickness of the multilayer sheet B is 50 to 250 μm and that the thickness of the core layer accounts for 35% or more and below 85% of the entire thickness of the multilayer sheet B. When the entire thickness of the three-layer sheet is below 50 μm, problem of a so-called die sticking, where the multilayer sheet sticks on the die, is prone to be caused upon thermal fusion bonding in the multilayer sheet lamination step. In order to remove such trouble, it is necessary to control temperature for the fusion bonding, press pressure upon the fusion bonding, time for the fusion bonding, and the like. However, the control is complex, which tends to have trouble in the forming step. In addition, when the entire thickness of the three-layer sheet is above 250 μm, when the multilayer sheet for an electronic passport is formed by the use of the three-layer sheet having an entire thickness of above 250 μm, the total thickness is too large to be used. Further, in the multilayer sheet B, it is desirable that the thickness of the core layer accounts for 35% or more and below 85% of the entire thickness. When the skin layer is too thin, there is caused generation of the die sticking and deterioration of thermal adhesiveness, while, when the skin layer is too thick, the thickness of the core layer described later becomes inevitably small to cause a problem of a poor laser-marking property or generation of warpage after lamination of the multilayer sheet, which is not preferable.

By thus specifying the thickness of the entire three-layer sheet to desired thickness, not only local properties such as properties of the multilayer sheet B can easily be drawn out, but also the properties of the entire present embodiment as a laser-marking multilayer sheet (multilayer sheet of a multilayer sheet A and a multilayer sheet B) of the present embodiment can easily be drawn out. Further, since not only the total thickness of the entire three-layer sheet, but also the ratios of thickness of the skin layer and the thickness of the core layer to the thickness of the three-layer sheet are specified to the aforementioned desired ratios, with specifying the thickness of the entire three-layer sheet within a predetermined range, an effect of the present application such as improvement in the laser-marking property can be exhibited more.

Incidentally, since the problems of adhesiveness of the multilayer sheet and die sticking serve as very important elements of practical use and productivity of the multilayer sheet and regarding whether it can respond to a market need also in the multilayer sheet B like the multi layer sheet A, the relation between the total thickness of the entire three-layer sheet and thickness of each of the skin layer and the core layer will further be described later in the range without duplicating the multilayer sheet A.

[B-1-1] Skin Layer in Multilayer Sheet B:

The skin layers in the multilayer sheet B are constituted as both the outermost layers disposed on the outside of the three-layer sheet in the same manner as in the multilayer sheet A. That is, the skin layers are disposed so as to sandwich the core layer in the multilayer sheet B described later from both the end face sides (outsides) to play a role of surface layers (outermost layers of the three-layer sheet).

Thickness of the skin layers is preferably the same. When the multilayer sheet B is constituted of skin layers having different thickness, as described above, warpage of the sheet is generated in a multilayer sheet press step or the like, which is not preferable. In addition, for example, in the case that the multilayer sheet B is constituted of three layers of a skin layer (PETG)/a core layer (PC)/a skin layer (PETG) and that the thickness of the core layer is 35% or more and below 85%, the skin layer is 15% or more and below 65% in total on both sides. When the skin layer is too thin, generation of die sticking and deterioration of thermal adhesiveness are caused. On the other hand, when the skin layer is too thick, the core layer described later becomes thin inevitably to cause a problem of deterioration in laser-marking property or generation of warpage after the lamination of the multilayer sheet, which is not preferable. Therefore, it is desirable to form the skin layer to have a desirable thickness.

[B-1-1-1] Copolymer Polyester Resin:

The definition of the copolymer polyester resin in the multilayer sheet B is the same as the transparent laser-marking multilayer sheet A. Therefore, please refer to the description of the copolymer polyester resin for the multilayer sheet A ([A-1-1-1]).

[B-1-1-2] Lubricant:

In the multilayer sheet B, the addition amount of the lubricant is 0 to 3 parts by mass with respect to 100 parts by mass of the aforementioned copolymer polyester resin. The reason why 0 part by mass is included is because, for example, in the case that the laser-marking multilayer sheet is a lamination of the multilayer sheet A/the multilayer sheet B/the multilayer sheet A, it is not necessary to add the lubricant to the multilayer sheet B since the multilayer sheet B is not present on the outermost surface of the laminate. On the other hand, after printing is performed on a surface of a laminate sheet obtained by thermal fusion bonding the laminate sheet of the multilayer sheet A/the multilayer sheet B or the multilayer sheet B/another sheet/the multilayer sheet B, in the case of further laminating the multilayer sheet A/the laminate sheet B/the multilayer sheet A for thermal fusion bonding, it is necessary to add the lubricant because the multilayer sheet B forms the outermost surface of the laminate sheet in the former step. Therefore, in the multilayer sheet B, since the need for the lubricant depends on the method of usage and the lamination pattern, the addition amount is specified to 0 to 3 parts by mass so that it can be added as necessary.

Incidentally, the definition of the lubricant to be used in the case of adding the lubricant to the multilayer sheet B is the same as the lubricant used for the multilayer sheet A. Therefore, please refer to the description of the lubricant ([A-1-1-2]) in the multilayer sheet A.

[B-1-2] Constitution of Core Layer in Multilayer Sheet B:

A core layer in the multilayer sheet B is constituted as a so-called nucleus layer disposed in the center of the three sheets in the same manner as in the multilayer sheet A. That is, the core layer is formed as the nucleus layer of the three layer sheets in such a manner that it is sandwiched between two skin layers disposed on the outermost sides.

As the thickness of the core layer, the ratio of the thickness of the core layer to the thickness of the entire sheets is desirably 35% or more and below 85%. It is preferably 40% or more and below 80%. When the ratio of the thickness of the core layer is 85% or more, since the total thickness of the transparent laser marking multilayer sheet B is 50 to 250 the skin layer becomes relatively thin, and, even if a lubricant is mixed in a skin layer, there arises a problem of die sticking where the transparent laser-marking multilayer sheet A sticks to the die in a hot press step in a lamination step, which is not preferable. In addition, when the ratio of the thickness of the core layer is below 35%, though there does not arise die sticking since a skin layer is thick in a lamination step, a the laser-marking property deteriorates, and the thermal resistance becomes poor to cause warpage of the sheet, which is not preferable.

Regarding the material constituting the core layer, since it is the same as that for the multilayer sheet A, please refer to the description of the multilayer sheet A.

[B-1-2-1] Coloring Inorganic Pigment:

The multilayer sheet B is a colored laser-marking multilayer sheet, and 1 part by mass or more of a coloring inorganic pigment is blended with respect to 100 parts by mass of polycarbonate resin in the core layer of the multilayer sheet B. In this respect, the multilayer sheet B is different from the multilayer sheet A. The reason why 1 part by mass or more of a coloring inorganic pigment is because high color definition of a letter, a number, and an image is improved because of good contrasts in the case of marking by irradiating the laminate sheet of the transparent laser-marking multilayer sheet A and the colored layer-marking multilayer sheet B with a laser beam as described later.

Examples of the coloring inorganic pigment include titanium oxide, barium oxide, and zinc oxide as white pigments; ferric oxide, and titan yellow as yellow pigments; ferric oxide as a red pigment; and a cobalt blue ultramarine as a blue pigment. However, in order to enhance a contrast property, a faintly colored sickly pigment is preferable.

More preferable is addition of white inorganic pigment where the contrast stands out.

[B-1-3] Energy Absorber:

The kind and blend amount of the energy absorber in the multilayer sheet B are the same as in the multilayer sheet A. Therefore, please refer to the description of the multilayered sheet A.

[B-1-4] Antioxidant and/or Anticolorant:

The antioxidant and/or the anticolorant in the multilayer sheet B are/is the same as those/that for the transparent laser-marking multilayer sheet A. In addition, the ultraviolet absorber and/or the light stabilizer are/is the same as those/that for the transparent laser-marking multilayer sheet A. Therefore, please refer to the description of the multilayer sheet A.

[B-1-5] Matting:

In addition, it is preferable that one surface of the multilayer sheet B is subjected to matting. Further, it is preferable that both surfaces of the multilayer sheet B is subjected to matting to have an average roughness (Ra) of 0.1 to 5 μl. Incidentally, the matting in the multilayer sheet B is the same as that for the transparent laser-marking multilayer sheet A. Therefore, please refer to the description of the multilayer sheet A.

[C] Constitution of Film C:

The film C of the present invention is used so that a laser-marking multilayer sheet for an electronic passport of the present invention can easily be bound in an electronic passport as shown in FIG. 1. Therefore, there is no particular limitation on the shape, length, and the like as long as it has a shape, size, and the like where the laser-marking multilayer sheet for an electronic passport can easily be bound, and they can suitably be selected as necessary.

However, it is desirable that the film C has a thickness of 20 to 200 μm, preferably 50 to 150 μm. When the thickness of the film C is below 20 μm, since strength of the machine sawing portion is insufficient, there is concern that the multilayer sheet where personal information such as a personal image, letters, and numbers is laser-marked is peeled off from the electronic passport, while, when the thickness is above 200 μm, rigidity of the film C becomes too high, and there arises a problem that the electronic passport is naturally opened.

In addition, it is preferable that an end of the film C has a protruding portion protruding by 5 to 100 mm from the multilayer sheet A and the multilayer sheet B (see the protruding portion of No. 19 of FIG. 1). This is because forming the protruding portion on the film C makes binding the sheet to an electronic passport easy. That is, the protruding portion is for binding one end in the lengthwise direction of the film C to the electronic passport by machine sawing and/or bonding by the use of the protruding portion which is longer than the multilayer sheet A and the multilayer sheet B.

In addition, the size of the protruding portion is preferably 5 to 100 mm, more preferably 5 to 50 mm, furthermore preferably 5 to 20 mm.

By forming the protrusion portion in such a manner, binding of the sheet by machine sawing and/or bonding to the electronic passport in such a manner becomes easier (by the use of the protruding portion).

Incidentally, the length of the protruding portion is preferably determined according to the workability of the machine sawing and/or bonding and the strength of the machine sawing portion and bonding strength.

Further, as the material for the film C, in transparency, flexibility, tearing strength, tensile strength, and price, there may be used at least one kind selected from a polyester resin film, a thermoplastic urethane resin film, and a nylon resin film or one kind of cloth selected from polyester cloth and nylon cloth.

In addition, to the polyester resin film, thermoplastic urethane resin film, or nylon resin film of the film C, a hot melt adhesive or an adhesive may be applied on one surface and/or both surface as necessary. When the hot melt adhesive or the adhesive is applied, it is preferable that the hot melt adhesive or the adhesive has an application thickness of 0.1 to 20 μm. When it is below 0.1 μm, sufficient bonding strength is not exhibited, while, when it is above 20 μm, the total thickness becomes too large, or rigidity becomes too high, and there arises a problem that the electronic passport is naturally opened when the film C is bound to the electronic passport, which is not preferable. In addition, it is preferable that the polyester cloth or the nylon cloth of the film C is impregnated or coated with the thermoplastic resin or the hot melt adhesive, and, as the thermoplastic resin, a thermoplastic urethane resin is preferable.

[2] Relation Between Multilayer Sheet A and Multilayer Sheet B:

As described above, by laminating the multilayer sheet A and the multilayer sheet B, the effect of the present application can be exhibited. That is, the multilayer sheet is constituted of a transparent laser mark three-layer sheet composed of PETG/PC (laser mark)/PETG. Further, by laminating a colored laser mark multilayer sheet B composed of PETG/PC (colored laser mark)/PETG on the surface opposite to the surface irradiated with a laser beam of the multilayer sheet A, even if the core layer PC gains a black color by the irradiation of the upper layer (multilayer sheet A) with a laser, the laser beam further transmits to generate the black color of the core layer PC of the lower layer (multilayer sheet B). This improves the degree of black color of the portion colored with the laser beam.

Here, in order to sufficiently draw out the clearness of the image (ex. human face) by laser-marking, it becomes important to control the reflection rate and contrast. This is because, for example, when the reflection rate is insufficient or when the contrast is low, the clearness of the image decreases. In addition, when a laminate sheet is formed by thermal fusion bonding of a PETG/PC (white)/PETG three-layer sheet without responding to layer marking on the aforementioned three-layer sheet A (PETG/PC (laser mark)/PETG (transparent laser-marking three-layer sheet), since the three-layer sheet of the lower layer has the PETG transparent layer, the reflection rate becomes insufficient, which is not preferable. Further, when the PC (white) sheet is used for the lower layer of the multilayer sheet A instead of the aforementioned PETG/PC (white)/PETG three-layer sheet by taking the reflection rate and contrast into consideration, the reflection rate improves more than that of the case of PETG/PC (white)/PETG three-layer sheet, and the contrast between the black color by the laser marking of the upper layer (multilayer sheet A) and the white of the lower layer (PC sheet) improves, thereby improving clearness of the image. However, when the lower sheet is the PC (white) sheet, there arises a problem of thermal adhesiveness with the upper layer, and the thermal adhesiveness is poor at a low temperature of about 120 to 150° C. When the temperature is raised to 210 to 240° C., thermal fusion bonding goes on. However, in this case, since the PETG layer of the upper layer is softened and melted, a laminate sheet cannot be obtained.

Therefore, by allowing also the lower layer to respond to laser marking, even if the core layer becomes black by irradiating the upper layer with a laser beam, the laser beam further passes to generate black color also in the core layer PC of the lower layer. This improves the degree of black in the portion colored by the laser beam to obtain the contrast equivalent to that in the case of using PC (white) sheet in the lower layer, thereby making the image clear and inhibiting the problem in thermal adhesiveness from being caused. Thus, the present application synergistically exhibits an effect of the present application by the desired combination of the multilayer sheet A and multilayer sheet B.

Incidentally, there was described a laser-marking multilayer sheet in the present embodiment with respect to a disposition pattern where the multilayer sheet B is disposed under the multilayer sheet A. However, the disposition is not limited. That is, it is not necessary to dispose the multilayer sheet A as the upper layer and the multilayer sheet B as the lower sheet. For example, it is possible to employ the multilayer sheet A as the lower sheet and the multilayer sheet B as the upper sheet. The reason why the multilayer sheet A (multilayer sheet B) may be disposed as the upper layer or the lower layer is because the position (direction) where the laser-marked image or the like is observed by eyes is not limited to the vertical direction. In other wards, for example, when a laser-marking multilayer sheet of the present embodiment is used in the form of a brochure such as a passport, even in case of disposing the multilayer sheet A as the upper layer and the multilayer sheet B as the lower layer in the case of planar view in the opened state, the multilayer sheet B is disposed as the upper layer, and the multilayer sheet A is disposed as the lower layer in the case of planar view upon opening the next page as the disposition positions of the multilayer sheet A and the multilayer sheet B. Therefore, the upper layer and the lower layer here are used for convenience sake of description, and it means that the multilayer sheet A is disposed on the laser irradiation side and that the multilayer sheet B is disposed so as to be irradiated with the laser beam via the multilayer sheet A (penetrated). By disposition in this manner, the clearness of the image or the like and high contrast in the multilayer sheet A and the multilayer sheet B after being laser-marked can be obtained to exhibit an effect of the present application.

Further, in a laser-marking multilayer sheet in the present embodiment, not only the case of laminating the multilayer sheet A/the multilayer sheet B, but also the case of laminating, for example, the multilayer sheet A/the multilayer sheet B/the multilayer sheet A, the case of subjecting the surface of the laminate sheet obtained by thermal fusion bonding a laminate sheet of the multilayer sheet B/another sheet/the multilayer sheet B to printing or the like, followed by further laminating the multilayer sheet A/the laminate sheet/the multilayer sheet A, and the like are widely included. Flexible response according to the purpose for the use and the method for the use is possible to be able to exhibit an effect of the present application.

[3] Method for Forming Transparent Laser-Marking Multilayer Sheet A and Colored Layer-Marking Multilayer Sheet B:

In order to obtain the three-layered transparent laser-marking multilayer sheet A and the colored laser-marking multilayer sheet B in the present invention, there are, for example, a coextrusion method where the resin composition of each layer is subjected to coextrusion, a method where each layer is formed into a film shape and laminated, a method where two layers are formed by an extrusion forming method with then laminating a film independently formed on the two layers, and the like. From the viewpoints of productivity and costs, lamination by a coextrusion method is preferable.

Specifically, the resin composition of each layer is prepared or is formed into a pellet shape as necessary to be put in each hopper of a three-layer T die extruder where T dies are subjected to shared connection, followed by being melted at a temperature of 200° C. to 280° C., subjected to three-layer T die coextrusion and to solidification by cooling with a cooling roll or the like to form a three-layered laminate. Incidentally, the transparent laser-marking multilayer sheet A and the colored laser-marking multilayer sheet B of the present invention can be formed by a know method without being limited to the aforementioned method. For example, they can be obtained according to the description on Pages 6 and 7 of JP-A-10-71763.

The multilayer sheet A and the multilayer sheet B obtained as described above are laminated and bonded by thermal fusion bonding or the like for desired time under desired pressure at desired temperature to obtain a laser-marking multilayer sheet. More specifically, it may be manufactured by a method where, after each of the multilayer sheets A and B is subjected to extrusion by melt coextrusion forming to obtain two kinds of three-layer sheets, which is rolled up, for example, the multi layer sheet A/the multilayer sheet B/the multilayer sheet A or the multilayer sheet B/another sheet/the multilayer sheet B is passed through heating rollers heated at predetermined temperature to be heated and pressed by the heating rollers to manufacture a long lamination sheet, followed by cutting to obtain a predetermined size. Further, after cutting the aforementioned multilayer sheets A and B to have a predetermined shape, a leaf-shaped lamination sheet of the multilayer sheet A/the multilayer sheet B/the multilayer sheet A or the multilayer sheet B/another sheet/the multilayer sheet B can be manufactured by a hot press machine in a similar manner to that described above.

[4] Constitution of Laminate Sheet of Present Invention:

A laser-marking multilayer sheet for an electronic passport of the present invention is constituted as a five-layer laminate of the multilayer sheet A/the multilayer sheet B/the film C/the multilayer sheet B/the multilayer sheet A. That is, by the laminate constitution of the multilayer sheet A/the multilayer sheet B, there is obtained a two-layer lamination laser-marking structure of at least a transparent laser-marking layer and a colored (including white) laser-making layer, where the contrast ratio in laser marking improves, and clearness of the image or the like improves in comparison with the laminate of a transparent laser-marking layer and a white layer. Therefore, an effect of the present application can be exhibited.

Further, by the constitution of a five-layered laminate of the multilayer sheet A/the multilayer sheet B/the film C/the multilayer sheet B/the multilayer sheet A, laser marking can be performed from any of the front surface and/or the back surface. In addition, it is one characteristic that almost no warpage is caused in the five-layer laminate sheet when the five-layer laminate is subjected to thermal fusion bonding by hot press forming. Incidentally, as the thickness of each layer, it is desirable that the multilayer sheet A has a thickness of 50 to 150 μm, that the multilayer sheet B has a thickness of 50 to 250 μm, and that the film C has a thickness of 20 to 200 μm.

In addition, the five-layer laminate sheet can be manufactured in various methods. For example, after laminating the multilayer sheet A/the multilayer sheet B/the film C/the multilayer sheet B/the multilayer sheet A, the laminate is subjected to thermal fusion bonding (thermal lamination) by hot press, or a hot melt adhesive or an adhesive is applied in advance to have a thickness of 0.1 to 20 μm on one surface and/or both the surfaces of each sheet to subject the lamination of the multilayer sheet A/the multilayer sheet B/the film C/the multilayer sheet B/the multilayer sheet A to thermal fusion bonding by hot press (thermal lamination) as described above in the case of applying the hot melt adhesive, or to subject the lamination of the multilayer sheet A/the multilayer sheet B/the film C/the multilayer sheet B/the multilayer sheet A to press bonding (dry lamination) in the case of applying the adhesive.

More preferable is to form a laser-marking multilayer sheet for an electronic passport by, after laminating the multilayer sheet B/the film C/the multilayer sheet B by thermal fusion bonding by hot press, printing is performed on a surface of the multilayer sheet B, and five sheets of the multilayer sheet A/the (multilayer sheet B/film C/multilayer sheet B) laminate sheet/the multilayer sheet A are laminated. This is because not only an effect of the present application is exhibited, but also convenience of easy forming or the like is improved.

In the case of laminating the multilayer sheets A on the multilayer sheets B where printing is performed on the surface thereof of the laminate of the multilayer sheet B/the film C/the multilayer sheet B to obtain five-layer lamination of the multilayer sheet A/the multilayer sheet B/the film C/the multilayer sheet B/the multilayer sheet A, the following procedure may be employed for forming. In the first place, the multilayer sheet B/the film C/the multilayer sheet B are subjected to thermal fusion bonding by hot press or to thermal fusion bonding by hot press with applying a hot melt adhesive on one surface of the multilayer sheet B. Next, printing is performed by the use of an UV curing ink. On one surface of the multilayer sheet A, a hot melt adhesive is applied in advance. Further, by hot press, a five-layer laminate sheet of the multilayer sheet A/the multilayer sheet B/the film C/the multilayer sheet B/the multilayer sheet A may be manufactured. However, the method is not limited to such a method, and the aforementioned five-layer laminate may be formed within the range of not deviating from the constitution and the effect of the present application.

In addition, though the hot press temperature in the case of thermal fusion bonding (thermal lamination) depends on the kind of the film C, it is 100 to 180° C., preferably 110 to 160° C. When the hot press temperature is below 100° C., adhesion failure may be caused, while, when it is above 180° C., a defect such as warpage or shrinkage of the five-layer laminate increases, which is not preferable.

Figure 2:
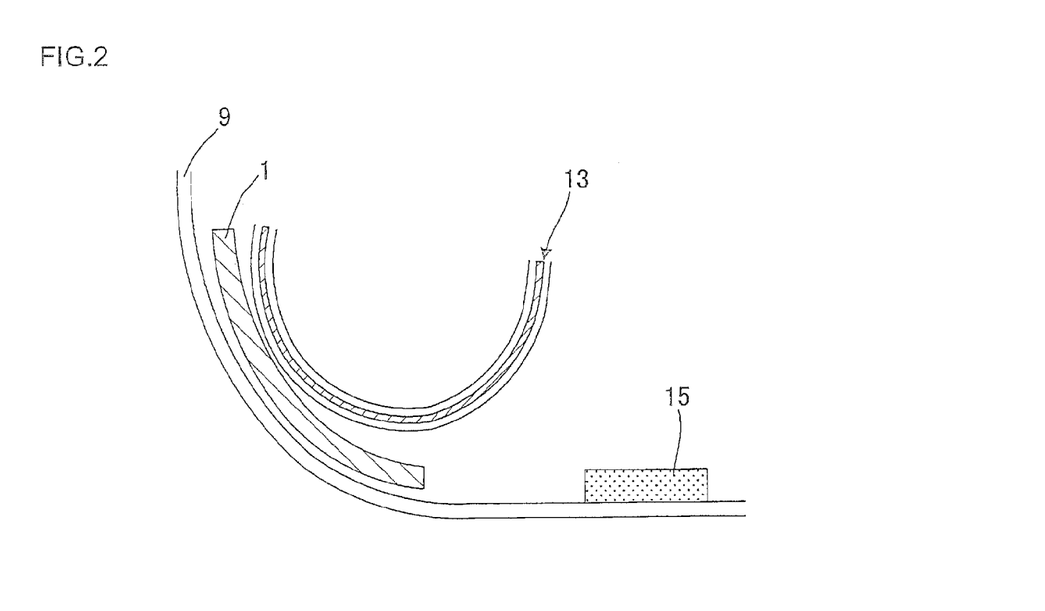
FIG. 2 is a schematic view showing an example where a laser-masking multilayer sheet for an electronic passport of the present invention is used for an electronic passport.

Further, in the case of manufacturing an electronic passport, it is preferable that a laser-marking multilayer sheet for an electronic passport as shown in FIG. 1 is prepared, that a machine sawing portion 17 or the like is formed as necessary, and that the front cover 9, the laminate 11 employing the present embodiment, visa sheets 13, the IC chip 15 and the like as shown in FIG. 2 are disposed to form an electronic passport. However, this is an example, and the constitution is not limited to such a constitution.

[5] Laser-Making Method:

A laser-marking multilayer sheet of the present embodiment is colored by being irradiated with a laser beam.

Examples of the laser beam include a gas laser such as He—Ne laser, Ar laser, $CO_2$ laser, and excimer laser; a solid laser such as YAG laser and $Nol.YVO_4$ laser; semiconductor layer; and pigment laser. Of these, YAG laser and $Nd.YVO_4$ laser are preferable.

Incidentally, as described above, to the aforementioned resin composition may be added other additives such as a release agent, a stabilizer, an antioxidant, an ultraviolet absorber, and a reinforcing agent.

In the laser-marking method of the present embodiment, as the laser beam, the laser beam may be in a single mode or multi mode, and a laser beam having a wide beam diameter of 80 to 100 μm may be used besides a laser beam having a narrow beam diameter of 20 to 40 μm. However, a laser beam having a beam diameter of 20 to 40 μm in a single mode is preferable in order to obtain printing quality having good contrasts with contrasts of three or more between the printed letter chromogenic portion and the base.

By thus irradiating the laser-marking multilayer sheet of the present embodiment with a laser beam, an image or the like can be drawn easily and clearly in a synergic manner due to the coloring of each of the multilayer sheet A and the multilayer sheet B constituting the laser-marking multilayer sheet. Therefore, the laser-marking sheet of the present embodiment is excellent in the laser-marking property, and white letters, a white symbol, a white pattern, and the like can be drawn easily and clearly on a black base with a laser beam on the surface or an interface portion between the support and the cover. In particular, it is possible to mark an information code such as a bar code with high resolution.

More preferable is a method for subjecting the aforementioned laser-marking multilayer sheet to laser marking, where printing is performed by irradiating the sheet from the multilayer sheet A side of the laser-marking multilayer sheet with a laser beam 7 as shown in FIG. 3. The irradiation with a desired laser beam from the laser-marking multilayer sheet side of the present embodiment in this manner enables to easily and clearly draw an image or the like more synergistically. Therefore, the laser-marking multilayer sheet of the present embodiment is excellent in laser marking properties, and white letters, a white symbol, a white pattern, and the like can be drawn more easily and clearly on a black base with a laser beam on the surface or an interface portion between the support and the cover. It is possible to mark an information code such as a bar code with high resolution.

EXAMPLE

Hereinbelow, the present invention will be described more specifically by Examples. However, the present invention is by no means limited to the Examples. In addition, various evaluations and measurements in the Examples were carried out by the following methods.

[1] Transparency of the Transparent Laser-Marking Multilayer Sheet A:

The whole beam transmittance of the transparent laser-marking multilayer sheet A was measured by the use of a spectrophotometer (trade name of "EYE7000" produced by GretagMacbeth GmbH).

Good: whole beam transmittance of 80% or more,
Fair: whole beam transmittance of 60% or more and below 80%,
Bad: whole beam transmittance of below 60%.

[2] Sheet Conveyance Property:

After the transparent laser-marking multilayer sheet A and the colored laser-marking multilayer sheet B of the Manufacture examples 1 to 12 were cut to have a size of 95×140 mm, they were conveyed by a sheet conveyer to have a laminate of the transparent laser-marking multilayer sheet A/the colored laser-marking multilayer sheet B. At that time, the sheet conveyance property was evaluated by the following criteria for judgment.

Good: no problem,
Fair: removal from the sucked in portion was fairly hard upon sheet lamination to cause slippage of a sheet,
Bad: removal from the sucked in portion was difficult upon sheet lamination

[3] Release Property after Lamination Hot Press Forming:

After the transparent laser-marking multilayer sheet A and the colored laser-marking multilayer sheet B of the Manufacture examples 1 to 12 were cut to have a size of 95×140 mm, a polyester resin film (Cosmoshine A4300 produced by Toyobo Co., Ltd.; thickness of 50 µm) was cut to have a size of 110×140 mm as the film C. Then, a laminate of the multilayer sheet A/the multilayer sheet B/the film C/the multilayer sheet B/the multilayer sheet A was obtained in such a manner that one end of the polyester resin film protruded by 15 mm. The laminate sheet was sandwiched by two chrome-plated steel plates and kept for 10 minutes at a press temperature of 130° C. under a pressure of 50 kgf/cm². Then, after cooling down to the room temperature, the sample sandwiched by the chrome-plated steel plates was taken out together with the chrome-plated steel plates, and release property from the die upon removing the chrome-plated steel plates from the sample was evaluated as follows:

Good: easily releasable,
Fair: slight adhesion to die. Releasable but damage is caused on the surface of the sheet, which is not usable.
Bad: Adhesion to die.

[4] Air Bubble Release and Thermal Adhesiveness:

a) Air bubble release: The condition of remaining air bubbles in the laminate after hot press was observed as described above to evaluate the air bubble release as follows:

Good: no air bubble in the laminate,
Bad: air bubble remaining in the laminate.

b) Thermal adhesiveness: The adhesiveness was observed by lightly inserting a cutter edge into a gap between the sheets constituting the laminate.

Good: no peeling,
Bad: peeling caused in a part or on the whole area.

[5] Laser-Marking Property:

Laser-marking property was evaluated by the use of Nd. $YVO_4$ laser (Trade name of "LT-100SA" produced by Laser Technology Co. Ltd., and trade name of "RSM103D" produced by Rofin-Sinar Technologies, Inc.). Specifically, for the laser-marking property, marking was performed at a laser irradiation speed of 400 mm/sec. to make a judgment as follows from the condition of contrast and presence/absence of defect such as surface layer destruction.

Good: Contrast ratio of 3 or more with no surface layer destruction and no resin burn.
Fair: Contrast ratio of 2 to below 3 with no surface layer destruction and no resin burn.
Bad: Contrast ratio of below 2 with surface layer destruction and resin burn.

Manufacture Example 1

Transparent Laser-Marking Multilayer Sheet A <1>

There were used a noncrystalline polyester (trade name of "Easter GNO71" produced by Eastman Chemical Company, with EG/CHDM=70/30 mol %) for the skin layers and a polycarbonate (trade name of "TARFLON FN2500A" produced by Idemitsu Kosan Co., Ltd., with a melt volume rate=8 $cm^3$/10 min.) for the core layer, and calcium stearate of 0.3 part by mass was blended as a lubricant into the noncrystalline polyester. Further, into the aforementioned polycarbonate were blended 0.001 part by mass of carbon black (#10 produced by Mitsui Chemicals, Inc., with an average particle diameter of 75 nm and a DBP oil absorption of 86 ml/100 g) as the energy absorber absorbing a laser beam, 0.1 part of n-octadesyl-3-(3,5-di-t-butyl-4-hydroxyphenyl)propionate (trade name of "Irganox 1076" produced by Ciba Specialty Chemicals Inc.) as the phenol based antioxidant, and 0.2 part of 2-(2'-hydroxy-3',5'-di-t-butylphenyl)-5-chlorobenzotriazole (trade name of "Tinuvin 327" produced by Ciba Specialty Chemicals Inc.) as the ultraviolet absorber to obtain a core sheet for a card of three layers of the skin layer/the core layer/the skin layer by T-die coextrusion, The sheet had a total thickness of 100 µm with allowing the thickness of the skin layers of the front side and the back side to be the same, and the layer had a constitution of the skin layer (27 µm)/the core layer (46 µm)/the skin layer (27 µm) so that the percentage of the thickness of the core layer was 46%. Further, both the surfaces was subjected to matting to have an average surface roughness (Ra) of 0.5 to 1.8 µm to obtain a three-layer transparent laser-marking multilayer sheet A<1>.

Manufacture Example 2

Transparent Laser-Marking Multilayer Sheet A<2>

In the same manner as in Manufacture Example 1, the total thickness of the sheet was 100 µm with allowing the thickness of the skin layers of the front side and the back side to be the same to make the constitution of the layer of the skin layer (40 µm)/the core layer (20 µm)/the skin layer (40 µm) with the percentage of the thickness of the core layer of 20%. Further, both the surfaces was subjected to matting to have an average surface roughness (Ra) of 0.5 to 1.8 µm to obtain a three-layer transparent laser-marking multilayer sheet A<2>.

Manufacture Example 3

Transparent Laser-Marking Multilayer Sheet A<3>

A transparent laser-marking multilayer sheet A <3> was obtained in the same manner as in Manufacture Example 1 except that the layer was constituted to be the skin layer (5 µm)/the core layer (90 µm)/the skin layer (5 µm) to have a proportion of the core layer thickness of 90% in Manufacture Example 1.

Manufacture Example 4

Transparent Laser-Marking Multilayer Sheet A<4>

A transparent laser-marking multilayer sheet A<4> was obtained in the same manner as in Manufacture Example 1 except that the lubricant was not added to the noncrystalline polyester in Manufacture Example 1.

Manufacture Example 5

Transparent Laser-Marking Multilayer Sheet A<5>

A transparent laser-marking multilayer sheet A<5> was obtained in the same manner as in Manufacture Example 1 except that carbon black as the laser beam energy absorber was not blended into the core layer of the three-layer sheet in Manufacture Example 1.

Manufacture Example 6

Transparent Laser-Marking Multilayer Sheet A<6>

A transparent laser-marking multilayer sheet A<6> was obtained in the same manner as in Manufacture Example 1 except that carbon black of 5 parts by mass as the laser beam energy absorber was blended into the core layer of the three-layer sheet in the Manufacture Example 1.

Manufacture Example 7

Colored Laser-Marking Multilayer Sheet B<1>

There were used a noncrystalline polyester (trade name of "Easter GN071" produced by Eastman Chemical Company, with EG/CHDM=70/30 mol %) for the skin layers and a polycarbonate (trade name of "TARFLON FN2500A" produced by Idemitsu Kosan Co., Ltd., with a melt volume rate=8 cm$^3$/10 min.) for the core layer, and calcium stearate of 0.3 part by mass was blended as a lubricant into the noncrystalline polyester. Further, into the aforementioned polycarbonate were blended 0.001 part by mass of carbon black as the energy absorber absorbing a laser beam, 0.1 part of n-octadesyl-3-(3,5-di-t-butyl-4-hydroxyphenyl)propionate (trade name of "Irganox 1076" produced by Ciba Specialty Chemicals Inc.) as a phenol based antioxidant, 0.2 part of 2-(2'-hydroxy-3',5'-di-t-butylphenyl)-5-chlorobenzotriazole (trade name of "Tinuvin 327" produced by Ciba Specialty Chemicals Inc.) as the ultraviolet absorber, and titanium oxide of 5 parts to obtain a colored layer-marking multilayer sheet B-<1> of three layers of the skin layer/the core layer/the skin layer by T-die coextrusion. The sheet had a total thickness of 110 µm with allowing the thickness of the skin layers of the front side and the back side to be the same, and the layer had a constitution of the skin layer (15 µm)/the core layer (80 µm)/the skin layer (15 µm) so that the percentage of the thickness of the core layer was 73%. Further, both the surfaces was subjected to matting to have an average surface roughness (Ra) of 0.5 to 1.8 µm to obtain a three-layer colored laser-marking multilayer sheet B<1>.

Manufacture Example 8

Colored Layer-Marking Multilayer Sheet B<2>

A colored layer-marking multilayer sheet B<2> was obtained in the same manner as in Manufacture Example 7 except that the layer was constituted to be the skin layer (60 µm)/the core layer (30 µm)/the skin layer (60 µm) to have a proportion of the core layer thickness of 20% in Manufacture Example 7.

Manufacture Example 9

Colored Layer-Marking Multilayer Sheet B<3>

A colored layer-marking multilayer sheet B<3> was obtained in the same manner as in Manufacture Example 7 except that the layer was constituted to be the skin layer (7.5 µm)/the core layer (135 µm)/the skin layer (7.5 µm) to have a proportion of the core layer thickness of 90% in Manufacture Example 7.

Manufacture Example 10

Colored Laser-Marking Multilayer Sheet B<4>

A colored laser-marking multilayer sheet B<4> was obtained in the same manner as in Manufacture Example 7 except that carbon black as the laser beam energy absorber was not blended into the core layer of the three-layer sheet in Manufacture Example 7.

Manufacture Example 11

Colored Laser-Marking Multilayer Sheet B<5>

A colored laser-marking multilayer sheet B<5> was obtained in the same manner as in Manufacture Example 7 except that titanium oxide was not blended into the core layer of the three-layer sheet in Manufacture Example 70

The aforementioned Manufacture Examples 1 to 11 were evaluated as Examples 1 to 3 and Comparative Examples 1 to 9 with the constitutions shown in Tables 1 to 3. The results are shown in Tables 1 to 3.

TABLE 1

|  | Example 1 | Example 2 | Example 3 | Comp. Ex. 1 | Comp. Ex. 2 | Comp. Ex. 3 |
|---|---|---|---|---|---|---|
| Transparent laser-marking multilayer sheet A | Manufacture Ex. 1 Multilayer sheet A<1> | Same as on the left | Same as on the left | Manufacture Ex. 2 Multilayer sheet A<2> | Manufacture Ex. 3 Multilayer sheet A<3> | Manufacture Ex. 4 Multilayer sheet A<4> |
| Colored laser-marking multilayer sheet B | Manufacture Ex. 7 Multilayer sheet B<1> | Same as on the left | Same as on the left | Same as on the left | Same as on the left | Same as on the left |
| Film C | Polyester resin film (50 μm) | Thermoplastic urethane resin film (100 μm) | Nylon cloth (impregnated with urethane) (110 μm) | Polyester resin film (50 μm) | Same as on the left | Same as on the left |
| Laminate constitution | A1/B1/C/B1/A1 | Same as on the left | Same as on the left | A2/B1/C/B1/A2 | A3/B1/C/B1/A3 | A4/B1/C/B1/A4 |
| Sheet conveyance property | Good | Good | Good | Good | Good | Good |
| Die releasability | Good | Good | Good | Good | Fair | Bad |
| Air bubble release | Good | Good | Good | Good | Good | Good |
| Thermal adhesiveness | Good | Good | Good | Good | Fair | Good |
| Transparency of transparent laser-marking multilayer sheet A | Good | Good | Good | Good | Good | Good |
| Laser-marking property | Good | Good | Good | Bad | Good | Good |

(Note)
Polyester resin film (50 μm) . . . Cosmoshine A4300 produced by Toyobo Co., Ltd.
(Note)
Thermoplastic urethane resin film (100 μm) . . . DUS501 produced by Sheedom Co., Ltd.
(Note)
Nylon cloth (110 μm, urethane impregnation type) . . . produced by Dynic Corporation

TABLE 2

|  | Comparative Example 4 | Comparative Example 5 | Comparative Example 6 |
|---|---|---|---|
| Transparent laser-marking multilayer sheet A | Manufacture Ex. 5 Multilayer sheet A<5> | Manufacture Ex. 6 Multilayer sheet A<6> | Manufacture Ex. 1 Multilayer sheet A<1> |
| Colored laser-marking multilayer sheet B | Manufacture Ex. 7 Multilayer sheet B<1> | Same as on the left | Manufacture Ex. 8 Multilayer sheet B<2> |
| Film C | Polyester resin film (50 μm) | Same as on the left | Same as on the left |
| Laminate constitution | A5/B1/C/B1/A5 | A6/B1/C/B1/A6 | A1/B2/C/B2/A1 |
| Sheet conveyance property | Good | Good | Good |
| Die releasability | Good | Good | Good |
| Air bubble release | Good | Good | Good |
| Thermal adhesiveness | Good | Good | Good |
| Transparency of transparent laser-marking multilayer sheet A | Good | Bad | Good |
| Laser-marking property | Bad | Fair | Bad |

(Note)
Polyester resin film (50 μm) . . . Cosmoshine A4300 produced by Toyobo Co., Ltd.

TABLE 3

|  | Comparative Example 7 | Comparative Example 8 | Comparative Example 9 |
|---|---|---|---|
| Transparent laser-marking multilayer sheet A | Manufacture Ex. 1 Multilayer sheet A<1> | Same as on the left | Same as on the left |
| Colored laser-marking multilayer sheet B | Manufacture Ex. 9 Multilayer sheet B<3> | Manufacture Ex. 10 Multilayer sheet B<4> | Manufacture Ex. 11 Multilayer sheet B<5> |
| Film C | Polyester resin film (50 μm) | Same as on the left | Same as on the left |
| Laminate constitution | A1/B3/C/B3/A1 | A1/B4/C/B4/A1 | A1/B5/C/B5/A1 |
| Sheet conveyance property | Good | Good | Good |

TABLE 3-continued

| | Comparative Example 7 | Comparative Example 8 | Comparative Example 9 |
|---|---|---|---|
| Die releasability | Good | Good | Good |
| Air bubble release | Good | Good | Good |
| Thermal adhesiveness | Fair | Good | Good |
| Transparency of transparent laser-marking multilayer sheet A | Good | Good | Good |
| Laser-marking property | Good | Fair | Bad |

(Note)
Polyester resin film (50 μm) . . . Cosmoshine A4300 produced by Toyobo Co., Ltd.

(Discussion)

As shown in Tables 1 to 3, any of Examples 1 to 3 had excellent sheet conveyance property, die releasability after lamination hot press, air bubble release, thermal adhesiveness, and excellent laser-marking property. Incidentally, experiment was performed by the use of a sheet produced in the same manner as in Example 1 except that it was not subjected to matting, and no problem was found regarding the use. However, the experiment backed up the superiority of the sheet subjected to matting as shown in Example 1 in improvement of yield.

In contrast, since Comparative Example 1 had a core layer thickness percentage of 20% of the transparent laser-marking multilayer sheet A<2>, it had a poor laser-marking property. Since Comparative Example 2 had a core layer thickness percentage of 90% of the transparent laser-marking multilayer sheet A<3>, the skin layers were thin to cause a problem in die releasability and thermal adhesiveness after lamination hot press. In Comparative Example 3, since no lubricant was added to the skin layer of the transparent laser-marking multilayer sheet A<4>, the sheet had poor die releasability in the hot press step, and its practical use was difficult. In Comparative Example 4, since no carbon black as the laser beam energy absorber was blended into the core layer of the transparent laser-marking multilayer sheet A<5>, the sheet had a poor laser-marking property. In Comparative Example 5, much carbon black of 5 parts by mass as the laser beam energy absorber was blended into the core layer of the transparent laser-marking multilayer sheet A<6>, the transparent laser-marking multilayer sheet A<6> had poor transparency and a poor laser-marking property. Since Comparative Example 6 had a core layer thickness percentage of 20% of the colored laser-marking multilayer sheet B<2>, it had a poor laser-marking property. Since Comparative Example 7 had a core layer thickness percentage of 90% of the colored laser-marking multilayer sheet B<3>, the skin layers were thin to cause a problem in thermal adhesiveness. In Comparative Example 8, since no carbon black as the laser beam energy absorber was blended into the core layer of the colored laser-marking multilayer sheet B<4>, the sheet had a poor laser-marking property. In Comparative Example 9, since no titanium oxide was blended into the core layer of the colored laser-marking multilayer sheet B<5>, the sheet had a poor laser-marking property.

INDUSTRIAL APPLICABILITY

A transparent laser-marking multilayer sheet A and a colored laser-marking multilayer sheet B of the present invention are non-PVC based multilayer sheets. By the laminate structure of the multilayer sheet A/the multilayer sheet B/the film C/the multilayer sheet B/the multilayer sheet A, it has clear and excellent laser-marking properties regarding not only letters and numbers but also an image by the laser beam irradiation, and the multilayer sheet is excellent in a sheet conveyance property, lamination property, thermal adhesiveness, and thermal resistance without deformation, "warpage", of the lamination sheet also in the multilayer sheet lamination and hot press steps. Further, upon binding for an electronic passport of these laser-marking multilayer sheets, binding can be performed by a simple method such as machine sawing, and it is very effective for inhibiting forgery by laser marking, thereby being used suitably for an electronic passport.

DESCRIPTION OF REFERENCE NUMERALS

1: laser-marking multilayer sheet, 3: multilayer sheet A, 3a: skin layer (of multilayer sheet A), 3b: core layer (of multilayer sheet A), 5: multilayer sheet B, 5a: skin layer (of multilayer sheet B), 5b: core layer (of multilayer sheet B), 7: laser beam, 9: front cover, 11: laminate, 13, visa sheet, 15: IC chip, 17: machine sawing portion, 19: protruding portion, C: film (laminating film)

The invention claimed is:

1. A laser-marking multilayer sheet for an electronic passport, which is formed by laminating five layers of a multilayer sheet A/a multilayer sheet B/a film C/a multilayer sheet B/a multilayer sheet A;

wherein the multilayer sheet A is a transparent laser-marking multilayer sheet having skin layers and a core layer and formed of at least three layers of sheets laminated by a coextrusion method, the skin layers functioning as the outermost layers of the multilayer sheet A are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90/10 to 30/70 by mol %, the core layer of the multilayer sheet A is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates having an average particle diameter of below 150 nm, the entire thickness of the multilayer sheet A is 50 to 150 μm, and the thickness of the core layer accounts for 35% or more and below 85% of the entire thickness of the multilayer sheet A, the multilayer sheet B is a colored laser-marking multilayer sheet having skin layers and a core layer and formed of at least three layers of sheets laminated by a coextrusion method, the skin layers functioning as the outermost layers of the multilayer sheet B are formed of a noncrystalline aromatic polyester based resin composition which is a polyester composed of a dicarboxylic acid unit having mainly a telephthalate unit, an ethylene glycol unit (I), and a glycol unit having mainly 1,4-cyclohexane dimethanol unit (II) and which contains 0.01 to 3 parts by mass of at least one kind of lubricant selected from fatty acid esters, fatty acid amides, and fatty acid metal salts with respect to 100 parts by mass of a copolymerized polyester resin having a ratio of the ethylene glycol unit (I) to the 1,4-cyclohexane dimethanol unit (II) ((I)/(II)) of 90/10 to 30/ζby mol %, the core layer of the multilayer sheet B is formed of a polycarbonate based resin composition containing, with respect to 100 parts by mass of polycarbonate resin, 0.0001 to 3 parts by mass of carbon black which is an energy absorber or a mixture of 0.0001 to 3 parts by mass of carbon black and 0 to 6 parts by mass of at least one kind selected from metal oxides, metal sulfides, metal carbonates, and metal silicates, and 1 part by mass of a coloring inorganic pigment, the entire thickness of the multilayer sheet B is 50 to 250 μm, and the thickness of the core layer accounts for 35% or more and below 85% of the entire thickness of the multilayer sheet B, and the film C is a laser-marking multilayer sheet made of one film selected from a polyester resin film, a thermoplastic urethane resin film and a nylon resin film or one kind of cloth selected from polyester cloth and nylon cloth, and the thickness of the film C is 20 to 200 μm.

2. The laser-marking multilayer sheet for an electronic passport according to claim 1, wherein one end of the film C has a protruding portion protruding by 5 to 100 mm from the multilayer sheet A and the multilayer sheet B.

3. The laser-marking multilayer sheet for an electronic passport according to claim 2, which is formed by, after laminating the multilayer sheet B/the film C/the multilayer sheet B and then performing printing on a surface of the sheet B, laminating the multilayer sheets A to obtain a five layers of the multilayer sheet A/the multilayer sheet B/the film C/the multilayer sheet B/the multilayer sheet A.

4. The laser-marking multilayer sheet for an electronic passport according to claim 3, wherein at least one surface of each of the multilayer sheets A and the multilayer sheets B is subjected to matting.

5. The laser-marking multilayer sheet for an electronic passport according to claim 3, wherein a surface of each of the multilayer sheets A and the multilayer sheets B is subjected to matting to have an average roughness (Ra) of 0.1 to 5 μm.

6. An electronic passport, where a laser-marking multilayer sheet for an electronic passport according to claim 3 is used and where the five-layer lamination sheet of the multilayer sheet A/the multilayer sheet B/the film C/the multilayer sheet B/the multilayer sheet A is attached to the front cover or the back cover of the electronic passport by machine sawing and/or bonding by the use of the protruding portion of the film C.

7. The laser-marking multilayer sheet for an electronic passport according to claim 2, wherein at least one surface of each of the multilayer sheets A and the multilayer sheets B is subjected to matting.

8. The laser-marking multilayer sheet for an electronic passport according to claim 2, wherein a surface of each of the multilayer sheets A and the multilayer sheets B is subjected to matting to have an average roughness (Ra) of 0.1 to 5 μm.

9. An electronic passport, where a laser-marking multilayer sheet for an electronic passport according to claim 2 is used and where the five-layer lamination sheet of the multilayer sheet A/the multilayer sheet B/the film C/the multilayer sheet B/the multilayer sheet A is attached to the front cover or the back cover of the electronic passport by machine sawing and/or bonding by the use of the protruding portion of the film C.

10. The laser-marking multilayer sheet for an electronic passport according to claim 1, which is formed by, after laminating the multilayer sheet B/the film C/the multilayer sheet B and then performing printing on a surface of the sheet B, laminating the multilayer sheets A to obtain a five layers of the multilayer sheet A/the multilayer sheet B/the film C/the multilayer sheet B/the multilayer sheet A.

11. The laser-marking multilayer sheet for an electronic passport according to claim 10, wherein at least one surface of each of the multilayer sheets A and the multilayer sheets B is subjected to matting.

12. The laser-marking multilayer sheet for an electronic passport according to claim 10, wherein a surface of each of the multilayer sheets A and the multilayer sheets B is subjected to matting to have an average roughness (Ra) of 0.1 to 5 μm.

13. An electronic passport, where a laser-marking multilayer sheet for an electronic passport according to claim 10 is used and where the five-layer lamination sheet of the multilayer sheet A/the multilayer sheet B/the film C/the multilayer sheet B/the multilayer sheet A is attached to the front cover or the back cover of the electronic passport by machine sawing and/or bonding by the use of a protruding portion of the film C.

14. The laser-marking multilayer sheet for an electronic passport according to claim 1, wherein at least one surface of each of the multilayer sheets A and the multilayer sheets B is subjected to matting.

15. The laser-marking multilayer sheet for an electronic passport according to claim 1, wherein a surface of each of the multilayer sheets A and the multilayer sheets B is subjected to matting to have an average roughness (Ra) of 0.1 to 5 μm.

16. The laser-marking multilayer sheet for an electronic passport according to claim 1, wherein the core layer and/or the skin layer of the multilayer sheet A and/or the multilayer sheet B contain(s) 0.1 to 5 parts by mass of an antioxidant and/or an anticolorant and 0.1 to 5 parts by mass of an ultraviolet absorber and/or a light stabilizer with respect to 100 parts by mass of thermoplastic resin.

17. The laser-marking multilayer sheet for an electronic passport according to claim 1, wherein a hot-melt adhesive is applied on one surface of each of the multilayer sheet A and the multilayer sheet B.

18. An electronic passport, where a laser-marking multilayer sheet for an electronic passport according to claim 1 is used and where the five-layer lamination sheet of the multilayer sheet A/the multilayer sheet B/the film C/the multilayer sheet B/the multilayer sheet A is attached to the front cover or the back cover of the electronic passport by machine sawing and/or bonding by the use of a protruding portion of the film C.

19. A method for laser-marking on an electronic passport according to claim 18,
wherein printing is performed by irradiation with a laser beam from the side of the multilayer sheet A laminated in the laser-marking multilayer sheet.

20. A method for laser-marking on a laser-marking multilayer sheet according to claim 1, wherein printing is performed by irradiation with a laser beam from the side of the multilayer sheet A laminated in the laser-marking multilayer sheet.

* * * * *